(12) United States Patent
Kawano et al.

(10) Patent No.: US 6,873,124 B2
(45) Date of Patent: Mar. 29, 2005

(54) ROTATIONAL SPEED CONTROLLER FOR ELECTRICALLY POWERED TOOLS

(75) Inventors: Yoshikazu Kawano, Hitachinaka (JP); Nobuhiro Takano, Hitachinaka (JP); Yuuichi Satou, Hitachinaka (JP); Toshihiko Tachibana, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 10/732,287

(22) Filed: Dec. 11, 2003

(65) Prior Publication Data

US 2004/0119431 A1 Jun. 24, 2004

(30) Foreign Application Priority Data

Dec. 11, 2002 (JP) ..................................... P2002-358925

(51) Int. Cl.$^7$ .............................................. H02P 5/418
(52) U.S. Cl. ....................... 318/244; 318/268; 388/816; 388/820
(58) Field of Search ................................ 318/244, 245, 318/268, 432, 433; 388/809, 813, 816, 819, 820

(56) References Cited

U.S. PATENT DOCUMENTS

| 4,246,528 A | * | 1/1981 | Nakajima | .................... | 318/721 |
| 4,307,325 A | * | 12/1981 | Saar | ............................. | 388/809 |
| 4,628,233 A | * | 12/1986 | Bradus | ........................ | 388/809 |
| 4,885,511 A | * | 12/1989 | Millauer et al. | ............. | 318/434 |
| 5,530,325 A | * | 6/1996 | Friedrich et al. | ........... | 318/245 |
| 5,650,697 A | * | 7/1997 | Imagi et al. | ................. | 318/254 |

\* cited by examiner

*Primary Examiner*—Bentsu Ro
(74) *Attorney, Agent, or Firm*—Antonelli, Terry, Stout & Kraus, LLP

(57) ABSTRACT

A rotational speed controller maintains a constant low speed during idling, a constant high speed when a load is applied and controls motor rotational speed in the range between low and high speed to ensure safe operation when used in an electrically powered tool. When the current detection signal output from a current detection circuit is lower than a first predetermined value (during idling), a rotational speed setting circuit outputs a rotational speed setting signal indicating a first rotational speed to drive the motor at a constant low speed. When the current detection signal exceeds a second predetermined value (when a load is applied), the rotational speed setting circuit outputs a rotational speed setting signal indicating the second rotational speed to drive the motor at a constant high speed. When the current detection signal output from the current detection circuit is between the first and second predetermined values, the rotational speed setting circuit outputs a rotational speed setting signal indicating a motor rotational speed that is roughly proportional to the current detection signal level.

14 Claims, 3 Drawing Sheets

ROTATIONAL SPEED CONTROLLER FOR ELECTRICALLY POWERED TOOLS

BACKGROUND OF THE INVENTION

1. Field of the Invention

The present invention relates to a rotational speed controller that controls a motor speed depending on a load imposed on a motor.

2. Description of the Related Art

Heretofore, electrically powered tools use a rotational speed control system that automatically reduces a motor rotational speed to a predetermined idling speed when no load is imposed on a motor and automatically increases the motor rotational speed when a load is imposed on the motor, as disclosed in Japanese Patent Application Publication No. 60-77694 and Japanese Patent No. 3301533.

The prior art described above adopts a control system that prevents the motor from reaching a work speed immediately after the tool is powered and also prevents the motor from switching from the work speed to an idling speed when a load is not momentarily imposed on the motor. However, with such a control system, when the load current increases and exceeds a reference value, the motor is switched from the idling speed to the work speed. On the other hand, when the load current decreases and falls below the reference value, the motor is switched from the work speed to the idling speed.

As such, the load current that flows in the motors in saber saws, circular saws and other tools increases immediately after the blade is brought into contact with a workpiece. When the load current exceeds the reference value, the rotational speed of the motor is abruptly switched from the idling speed to the work speed. This abrupt change of the motor speed is dangerous for the operator cutting the workpiece with the saber saw or the like.

SUMMARY OF THE INVENTION

In view of the foregoing, it is an object of the present invention to eliminate the drawbacks of the prior arts and to provide a rotational speed controller that can adequately control the motor rotational speed depending on the level of a load imposed on the motor during the transition from idling to work speed.

In order to achieve the above and other objects, there is provided a rotational speed controller that includes a semiconductor device, a rotational speed detector, a rotational speed setter, a comparator, a phase controller, and a current detector. The semiconductor device controls the voltage applied to a motor. The rotational speed detector detects an actual rotational speed of the motor and outputs a rotational speed detection signal indicative of the actual rotational speed detected by the rotational speed detector. The rotational speed setter sets a target rotational speed of the motor and outputs a rotational speed setting signal indicative of the target rotational speed set by the rotational speed setter. The comparator compares the rotational speed detection signal with the rotational speed setting signal and outputs a signal indicative of a comparison result. The phase controller controls a firing angle of the semiconductor device based on the signal output from the comparator. The current detector detects a current flowing in the motor and outputs a current detection signal indicative of the current flowing in the motor. In the rotational speed controller thus constructed, the rotational speed setter operates in a manner described below.

The rotational speed setter outputs a first rotational speed setting signal indicative of a first rotational speed when the current detection signal output from the current detector is equal to or less than a first predetermined value. The rotational speed setter outputs a second rotational speed setting signal indicative of a second rotational speed higher than the first rotational speed when the current detection signal output from the current detector is equal to or higher than a second predetermined value. The rotational speed setter outputs a third rotational speed setting signal indicative of a speed in a range between the first rotational speed and the second rotational speed when the current detection signal output from the current detector is between the first predetermined value and the second predetermined value. The speed indicated by the third rotational speed setting signal changes corresponding to a change in the current detection signal.

The rotational speed controller thus constructed operates as follows. When there is no load on the motor and the current detection signal output from the current detector is higher than the first predetermined value, the rotational speed setter outputs a rotational speed setting signal indicative of the first rotational speed and drives the motor at a constant slow speed. When the current detection signal is higher than the second predetermined value, the rotational speed setter outputs a second rotational speed setting signal indicating the second rotational speed and drives the motor at a constant high speed. When the current detection signal output from the current detector is between the first and second predetermined values, the rotational speed setter outputs a third rotational speed setting signal indicative of a motor rotational speed in the range between the first rotational speed and the second rotational speed that is precisely or roughly proportional to the current detection signal. As a result, the motor rotational speed increases or drops gradually in the range between the first and second rotational speeds to improve operation safety when used in electrically powered tools.

As such, a low motor load generates low level current and a relatively slow speed while a heavier load produces a higher level current and a corresponding increase in speed. An increase in motor load in the range between constant low speed control (first rotational speed) and constant high speed control (second rotational speed) therefore causes motor rotational speed to rise accordingly. Thus when the invention is used to power electrically powered tools, such as a saber saw or circular saw, for cutting operations, the reciprocating or rotary movement of the blade changes substantially in proportion to the pressure exerted on the saw when in contact with the workpiece. This produces electrically powered tools with predictable behavior and improves work safety.

In addition to the features described above, it is desirable that the rotational speed setter includes a first predetermined value setter that sets the first predetermined value and a second predetermined value setter that sets the second predetermined value.

It is further desirable that the first predetermined value setter includes a first adjusting unit that adjusts the first predetermined value, and the second predetermined value setter includes a second adjusting unit that adjusts the second predetermined value. The first and second adjusting units allow adjustments to be made to the first and second predetermined values to cope with discrepancies in motor characteristics (current-speed) and thereby tailor rotational speed controller performance to the requirements of specific electrically powered tools.

In addition to the features described above, it is desirable that the rotational speed controller further includes a first rotational speed adjusting unit that adjusts the first rotational speed. Also, it is desirable that the rotational speed controller further includes a second rotational speed adjusting unit that adjusts the second rotational speed. With the provision of the first and second rotational speed adjusting units, the motor rotational speed can be accurately adjusted corresponding to the motor load. Since it is assumed that no load is applied to the motor (when idling) when the current detection signal output from the current detector is lower than the first value, a low speed can be set for motor rotational speed (first rotational speed). This reduces noise, vibration and power consumption during idling and prolongs motor service life. This also increases operation safety when this invention is used in electrically powered tools such as saber saws, circular saws and other cutting tools or disk grinders used for grinding operations.

As described above, the rotational speed setting signal indicative of the first rotational speed is output to maintain constant motor rotational speed when the current detection signal output from the current detection falls below the first predetermined value, for example during idling. Thus a stable idling speed is maintained even when the current fluctuates in the range below the first predetermined value.

The rotational speed setting signal indicative of the second rotational speed is output to maintain maximum speed when the current detection signal output from the current detector is higher than the second predetermined value. Thus a stable motor rotational speed is maintained even when motor load (motor current) exceeds the second predetermined value.

The motor rotational speed in the constant speed area when the current applied to the motor is below the first or above the second predetermined value can be set as desired. This makes it easy to adjust motor rotational speed specifications to a variety of applications, for example, for electrically powered tool applications.

According to another aspect of the invention, there is provided an electrically powered tool having a motor and the rotational speed controller described above.

DETAILED DESCRIPTION OF THE PREFERRED EMBODIMENTS

Figure 1:
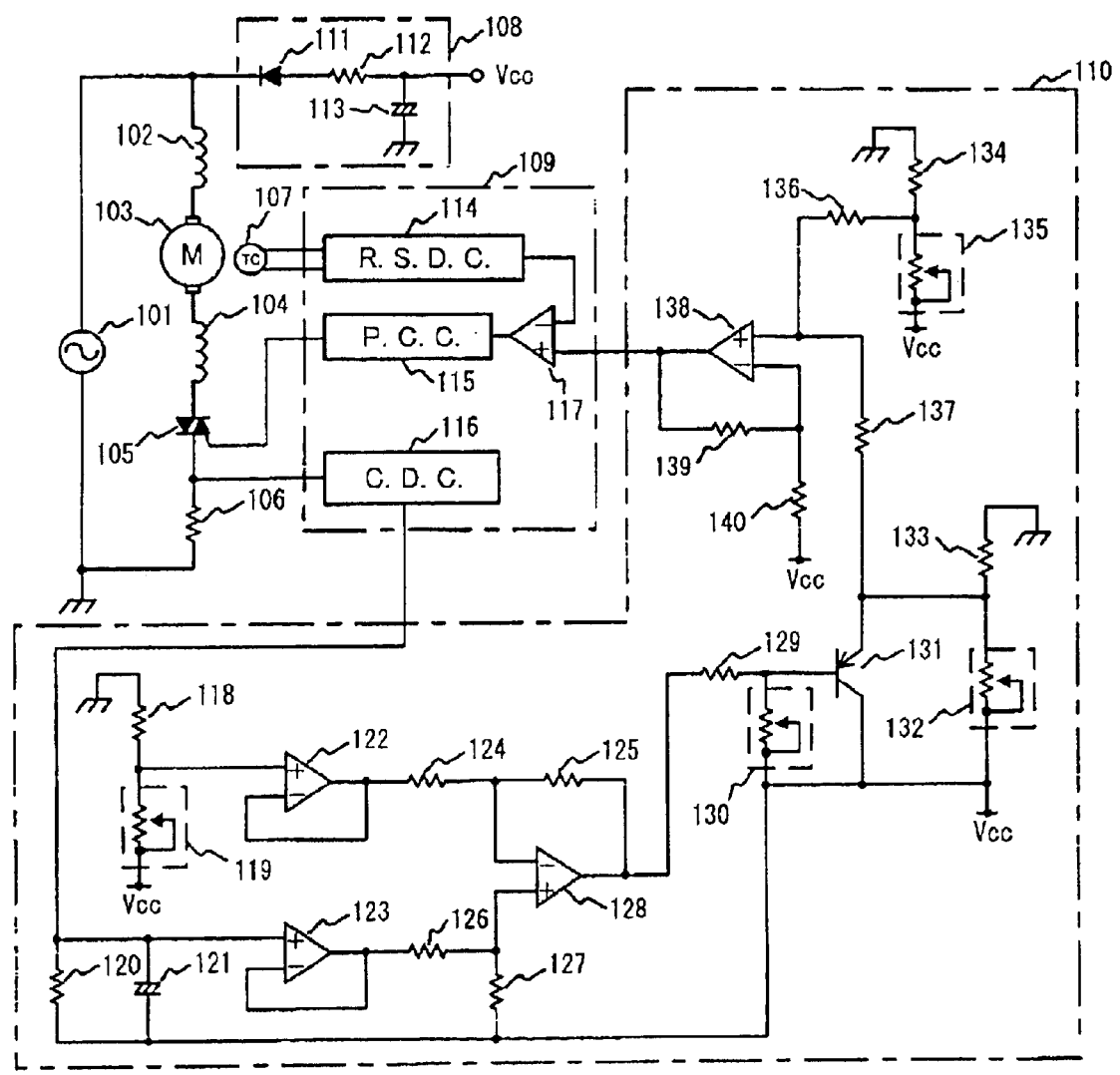
FIG. 1 is a block diagram showing a rotational speed controller according to an embodiment of the invention.

A rotational speed controller in accordance with a preferred embodiment of the invention will be described with reference to FIG. 1. FIG. 1 is a block diagram showing the rotational speed controller.

The rotational speed controller controls the rotational speed of a motor 103. The rotational speed controller includes a circuit composed of an AC power supply 101, coils 102 and 104, a TRIAC 105 and a current detection resistor 106, all of which are connected in series and drive the motor 103. The rotational speed controller further includes a tachometer (TC) 107 that detects the rotational number per a unit time or the rotational speed of the motor 103, a rotational speed setting circuit 110 that sets a target rotational speed of the motor 103, and a rotational speed control IC 109 that controls rotations of the motor 103 based on the detected rotational speed and the target rotational speed of the motor 103.

The rotational speed control IC 109 includes a rotational speed detection circuit (R.S.D.C.) 114, a comparator 117, a phase control circuit (P.C.C.) 115 and a current detection circuit (C.D.C.) 116. The rotational speed detection circuit 114 is connected to the tachometer 107. The comparator 117 has an inverting input terminal connected to the output of the rotational speed detection circuit 114 and a non-inverting input terminal connected to the output of the rotational speed setting circuit 110. The comparator 117 compares the actual rotational number of the motor 103 with a target rotational number set by the rotational speed setting circuit 110. The phase control circuit 115 is connected to the output of the comparator 117 and drives the TRIAC 105 based on the comparison results output from the comparator 117. The current detection circuit 116 that detects current flowing in the motor 103 is connected the current detection resistor 106. The rotational speed control IC 109 is commercially available, so no further description is necessary.

The rotational speed controller has a reference voltage circuit 108 that generates a reference voltage to power each circuit of the rotational speed setting circuit 110. The reference voltage circuit 108 includes a diode 111, a resistor 112 and a capacitor 113, and generates a DC reference voltage Vcc from the AC voltage output by the AC power supply 101.

The rotational speed setting circuit 110 includes the following components: resistors 118, 120, 124, 125, 126, 127, 129, 133, 134, 136, 137, 139 and 140; variable resistors 119, 130, 132 and 135; capacitor 121; operational amplifiers 122, 123, 128 and 138; transistor 131. The rotational speed setting voltage is output to the non-inverting input terminal of the comparator 117. The rotational speed setting circuit 110 sets a motor rotational speed by outputting a first voltage, a second voltage or a voltage that is higher than the first voltage but lower than the second voltage. The first voltage drives the motor 103 to rotate slowly when no load is applied to the motor. The second voltage indicates maximum speed for constant speed control of the motor 103 when a load is imposed on the motor 103. A voltage higher than the first voltage but lower than the second voltage is used for intermediate load situations.

The rotational speed setting circuit 110 outputs signals to drive the motor 103 at idling speed in no load conditions and at maximum speed under load conditions. In changes from idling to load conditions, the speed of the motor 103 increases gradually from the idling speed to the maximum speed as the load current increases.

Operation of the rotational speed controller will next be described.

The tachometer 107 detects the rotational speed of the motor 103. The tachometer 107 outputs a pulse signal proportional to the speed of the motor 103 and inputs this pulse signal to the rotational speed detection circuit 114. The rotational speed detection circuit 114 converts the input pulse signal to a DC signal and inputs this signal to the inverting input terminal of the comparator 117. The rotational speed setting circuit 110 compares the input DC signal with the target rotational speed and inputs the comparison result to the phase control circuit 115. The phase control circuit 115 determines the firing angle of the TRIAC 105 based on the comparison result output from the comparator 117. When the speed of the motor 103 is reduced as a result of a load increase, the firing angle of TRIAC 105 is increased so that the speed of the motor 103 is substantially maintained at the target speed. This makes it possible to maintain constant speed of the motor 103 under changing load conditions.

The current detection resistor 106 detects the current flowing in the motor 103 and the current detection circuit 116 converts the detected current to a current detection signal (DC signal). When the current detection signal exceeds a preset value, the current detection circuit 116 stops or otherwise controls drive to the motor 103 to protect the motor 103 and TRIAC 105 from overcurrent.

The resistor 120 and the capacitor 121 average the current detection signal output from the current detection circuit 116. The resulting signal is input to the non-inverting input terminal of the operational amplifier 128 after going through the operational amplifier 123 (voltage follower). At the same time, a control start voltage set by the resistor 118 and the variable resistor 119 is input to the inverting input terminal of the operational amplifier 128 after going through the operational amplifier 122 (voltage follower). The operational amplifier 128 is an adder/subtracter amplifier that performs addition, subtraction and amplification of the input signal. An amplification factor of the operational amplifier is determined by the values of resistors 124, 125 and 127, Then the voltage of the processed current detection signal is divided by the resistors 129 and 130 and is input to the base of the transistor 131.

A maximum speed setting voltage determined by the resistor 133 and the variable resistor 132 is input to the emitter of the transistor 131. Emitter voltage is controlled by the current detection signal input to the base of the transistor 131. As a result, when the current detection signal (base voltage) rises high enough, the transistor 131 is turned off and the emitter voltage controlled by the resistor 133 and the variable resistor 132 is used as the maximum speed setting voltage. However, when the current detection signal (base voltage) is low, the transistor 131 is rendered ON and the emitter voltage drops according to the current detection signal (base voltage).

Next, the emitter voltage from transistor 131 is input to the non-inverting terminal of the operational amplifier 138. The operational amplifier 138 is an adder that adds the emitter voltage to the idling speed setting voltage as determined by the resistor 134 and the variable resistor 135 according to the values of resistors 136, 137, 139 and 140. The resulting signal is input to the rotational speed control IC 109.

The relationship between the size of the load applied to the motor 103 (the current flowing through the motor 103) and the speed of the motor 103 (rotational speed setting voltage) will be described with reference to FIG. 2.

When the current applied to the motor 103 (the current detection signal output by the current detection circuit 116) is low, the transistor 131 is rendered ON so that only a voltage across the emitter and base is output as the emitter voltage. Then a sum of the idling speed setting voltage determined by the resistor 134 and the variable resistor 135 and the emitter voltage between the base and the emitter is input to the rotational speed control IC 109 as the rotational speed setting voltage.

When the voltage of the current applied to the motor 103 (the current detection signal) exceeds the control start voltage determined by the resistor 118 and the variable resistor 119, the emitter voltage of the transistor 131 rises. As a result, the rotational speed setting voltage input to the rotational speed control IC 109 also rises. Then the base voltage of the transistor 131 that indicates the current applied to the motor 103 rises above the maximum speed setting voltage determined by the resistor 133 and the variable resistor 132 causing the transistor 131 to turn OFF. Since the emitter voltage can only rise as high as the maximum speed setting voltage set by the resistor 133 and the variable resistor 132, the rotational speed setting voltage that is input to the rotational speed control IC 109 remains constant.

Figure 2:
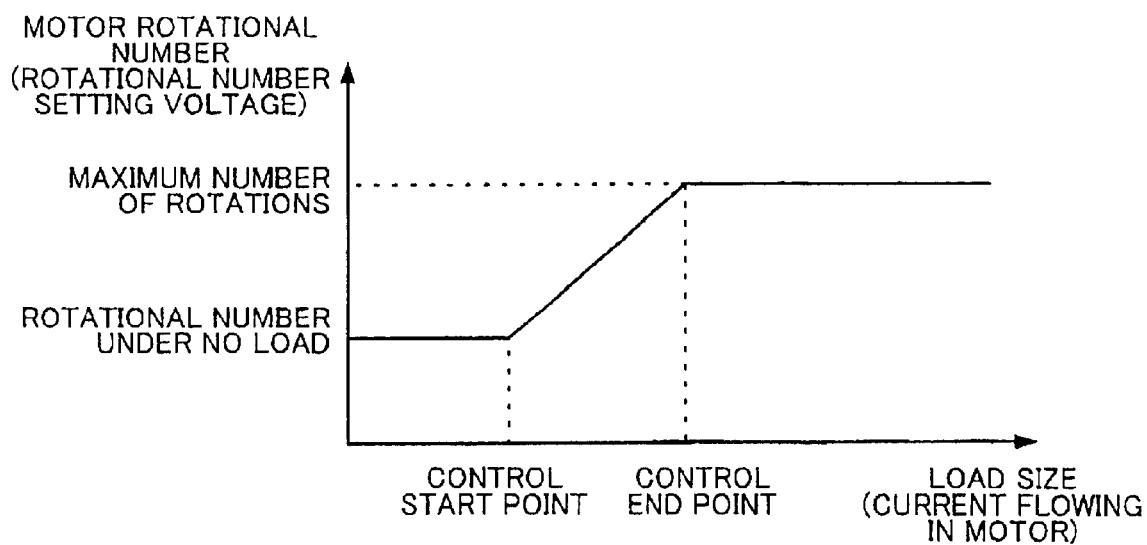
FIG. 2 is a graphical representation showing the characteristics of the rotational speed controller according to the embodiment of the invention.

As shown in FIG. 2, idling speed, maximum speed, control start point and control end point can be set as desired. Thus variable resistors 135, 132, 119 and 130 accurately control the idling speed, maximum speed, control start point and control end point, respectively. If accuracy is not required, variable resistors 119, 130, 132 and 135 can be replaced by fixed resistors that are tuned to motor characteristics (current and speed) and speed specifications.

Figure 3:
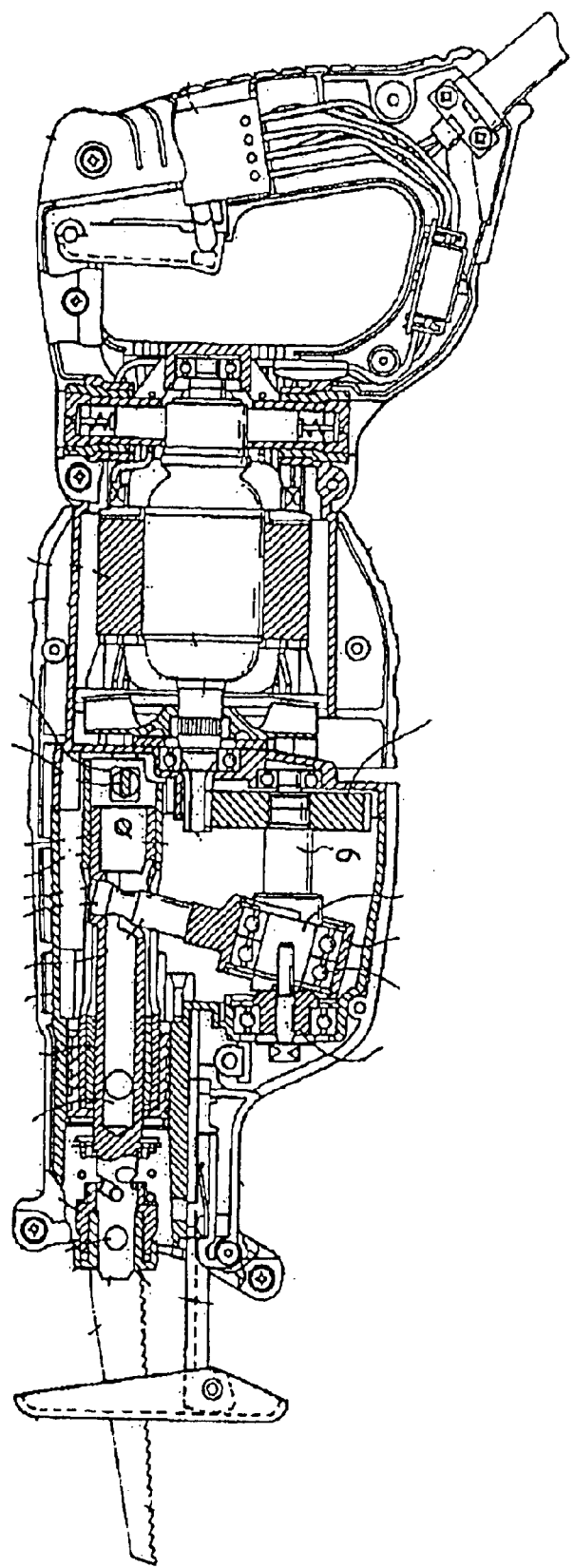
FIG. 3 is a cross-sectional view showing a saber saw in which the rotational speed controller shown in FIG. 1 is incorporated.

It should be noted that the rotational speed controller as described above can be used in conjunction with electrically powered tools, such as saber saws. FIG. 3 shows the inner structure of the saber saw into which the rotational speed controller as shown in FIG. 1 is incorporated. The structure of the saber saw is well known in the art, so the description thereof is omitted herein.

While the preferred embodiment of the invention has been illustrated and described, it will be appreciated that within the scope of appended claims various changes and modifications can be made therein without departing from the spirit of the invention.

What is claimed is:

1. A rotational speed controller for controlling a rotational speed of a motor, comprising:

a semiconductor device that controls a voltage applied to the motor;

a rotational speed detector that detects an actual rotational speed of the motor and outputs a rotational speed detection signal indicative of the actual rotational speed;

a rotational speed setter that sets a target rotational speed of the motor and outputs a rotational speed setting signal indicative of the target rotational speed;

a comparator that compares the rotational speed detection signal with the rotational speed setting signal and outputs a signal indicative of a comparison result;

a phase controller that controls the semiconductor device based on the signal output from the comparator; and a current detector that detects a current flowing in the motor and outputs a current detection signal indicative of the current flowing in the motor, wherein the rotational speed setter outputs selective one of a first rotational speed setting signal indicative of a first rotational speed when the current detection signal output from the current detector is equal to or less than a first predetermined value, a second rotational speed setting signal indicative of a second rotational speed higher than the first rotational speed when the current detection signal output from the current detector is equal to or higher than a second predetermined value, and a third rotational speed setting signal indicative of a speed in a range between the first rotational speed and the second rotational speed when the current detection signal output from the current detector is between the first predetermined value and the second predetermined value, the speed indicated by the third rotational speed setting signal changing corresponding to a change in the current detection signal.

2. The rotational speed controller according to claim 1, wherein the rotational speed setter comprises a first predetermined value setter that sets the first predetermined value and a second predetermined value setter that sets the second predetermined value.

3. The rotational speed controller according to claim 2, wherein the first predetermined value setter comprises a first adjusting unit that adjusts the first predetermined value.

4. The rotational speed controller according to claim 2, wherein the second predetermined value setter comprises a second adjusting unit that adjusts the second predetermined value.

5. The rotational speed controller according to claim 3, wherein the second predetermined value setter comprises a second adjusting unit that adjusts the second predetermined value.

6. The rotational speed controller according to claim 1, further comprising a first rotational speed adjusting unit that adjusts the first rotational speed.

7. The rotational speed controller according to claim 1, further comprising a second rotational speed adjusting unit that adjusts the second rotational speed.

8. An electrically powered tool comprising:

a motor;

a semiconductor device that controls a voltage applied to the motor;

a rotational speed detector that detects an actual rotational speed of the motor and outputs a rotational speed detection signal indicative of the actual rotational speed;

a rotational speed setter that sets a target rotational speed of the motor and outputs a rotational speed setting signal indicative of the target rotational speed;

a comparator that compares the rotational speed detection signal with the rotational speed setting signal and outputs a signal indicative of a comparison result;

a phase controller that controls the semiconductor device based on the signal output from the comparator; and a current detector that detects a current flowing in the motor and outputs a current detection signal indicative of the current flowing in the motor, wherein the rotational speed setter outputs selective one of a first rotational speed setting signal indicative of a first rotational speed when the current detection signal output from the current detector is equal to or less than a first predetermined value, a second rotational speed setting signal indicative of a second rotational speed higher than the first rotational speed when the current detection signal output from the current detector is equal to or higher than a second predetermined value, and a third rotational speed setting signal indicative of a speed in a range between the first rotational speed and the second rotational speed when the current detection signal output from the current detector is between the first predetermined value and the second predetermined value, the speed indicated by the third rotational speed setting signal changing corresponding to a change in the current detection signal.

9. The electrically powered tool according to claim 8, wherein the rotational speed setter comprises a first predetermined value setter that sets the first predetermined value and a second predetermined value setter that sets the second predetermined value.

10. The electrically powered tool according to claim 9, wherein the first predetermined value setter comprises a first adjusting unit that adjusts the first predetermined value.

11. The electrically powered tool according to claim 9, wherein the second predetermined value setter comprises a second adjusting unit that adjusts the second predetermined value.

12. The electrically powered tool according to claim 10, wherein the second predetermined value setter comprises a second adjusting unit that adjusts the second predetermined value.

13. The electrically powered tool according to claim 8, further comprising a first rotational speed adjusting unit that adjusts the first rotational speed.

14. The electrically powered tool according to claim 8, further comprising a second rotational speed adjusting unit that adjusts the second rotational speed.

* * * * *